United States Patent [19]
Tachigori et al.

[11] Patent Number: 6,073,455
[45] Date of Patent: Jun. 13, 2000

[54] REFRIGERANT LEAKAGE WARNING DEVICE FOR APPARATUS HAVING REFRIGERATION CYCLE USING FLAMMABLE REFRIGERANT

[75] Inventors: Riko Tachigori; Akira Fujitaka, both of Shiga; Yukio Watanabe, Kyoto; Yoshinori Kobayashi; Kanji Haneda, both of Shiga, all of Japan

[73] Assignee: Matsushita Electric Industrial Co., Ltd., Osaka, Japan

[21] Appl. No.: 09/248,275

[22] Filed: Feb. 11, 1999

[30] Foreign Application Priority Data

Feb. 13, 1998 [JP] Japan .................................. 10-049016

[51] Int. Cl.$^7$ .................................................. G01K 13/00
[52] U.S. Cl. ............................... 62/129; 165/11.1; 236/94
[58] Field of Search ............................. 62/129, 126, 127; 236/94; 165/11.1

[56] References Cited

U.S. PATENT DOCUMENTS

| | | | |
|---|---|---|---|
| 4,612,775 | 9/1986 | Branz et al. | 62/126 |
| 4,856,288 | 8/1989 | Weber | 62/129 |
| 5,009,076 | 4/1991 | Winsow | 62/129 |
| 5,209,076 | 5/1993 | Kauffman et al. | 62/126 |
| 5,228,304 | 7/1993 | Ryan | 62/129 |
| 5,301,514 | 4/1994 | Bessler | 62/126 |
| 5,481,884 | 1/1996 | Scoccia | 62/129 |
| 5,684,463 | 11/1997 | Diercks et al. | 340/584 |
| 5,974,863 | 11/1999 | Persson | 73/40.5 R |

*Primary Examiner*—Henry Bennett
*Assistant Examiner*—Marc Norman
*Attorney, Agent, or Firm*—Armstrong, Westerman, Hattori, McLeland & Naughton

[57] ABSTRACT

In a refrigerant leakage warning device for an apparatus having a refrigeration cycle using a flammable refrigerant as a refrigerant, when leakage of the refrigerant occurs, measures how to cope after the leakage of refrigerant occurs are indicated on an indoor unit. Therefore, the user can see the indication of the leakage and take the measures to cope with it, and it is possible to hold the damage at a minimum, and to enhance the safety.

19 Claims, 3 Drawing Sheets

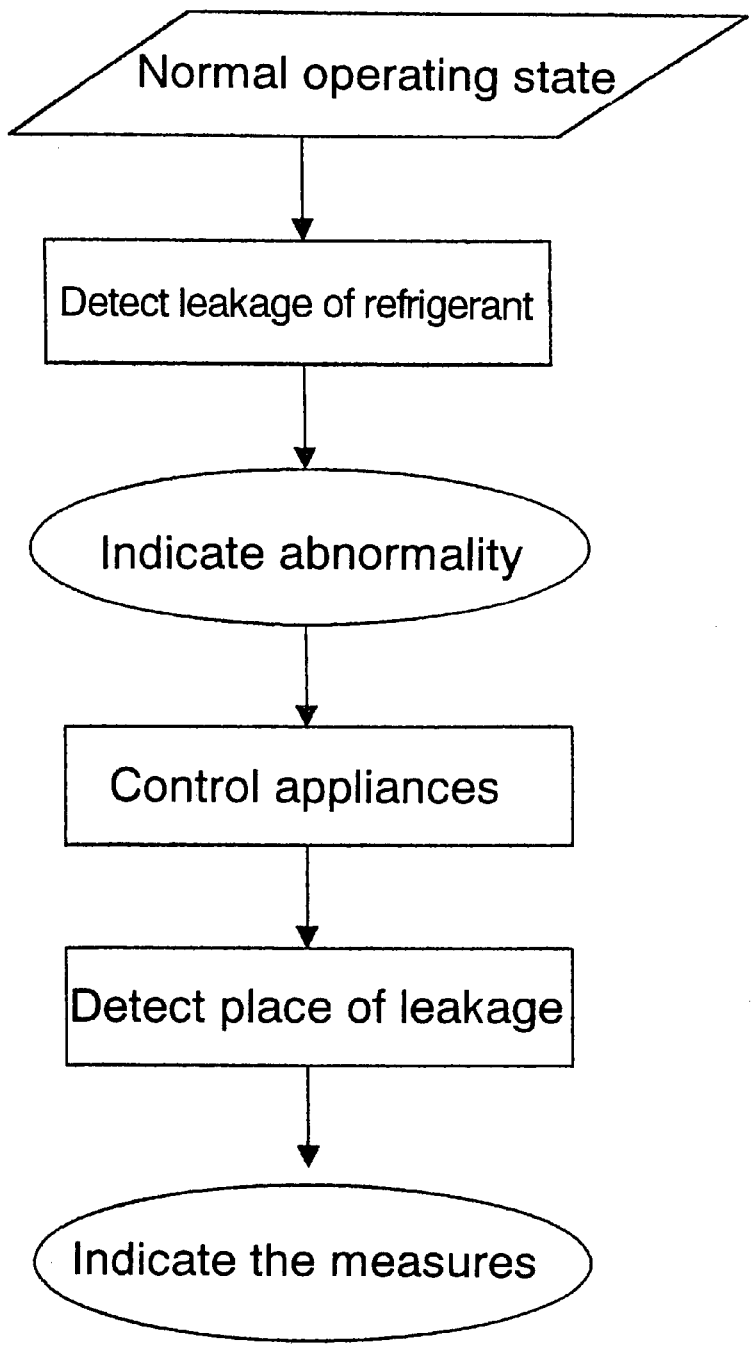

REFRIGERANT LEAKAGE WARNING DEVICE FOR APPARATUS HAVING REFRIGERATION CYCLE USING FLAMMABLE REFRIGERANT

TECHNICAL FIELD

The present invention relates to a refrigerant leakage warning device for an apparatus having a refrigeration cycle using a flammable refrigerant for informing a user of a danger and measures to deal with the danger when the refrigerant leaks.

BACKGROUND TECHNIQUE

At present, HCFC refrigerants such as R22 utilized in air conditioners have environmental issues to destroy the ozone layer.

In recent years, it is proposed to use HFC refrigerants as alternative refrigerants of HCFC refrigerants, but HFC refrigerants have environmental issues to facilitate the global warming.

Therefore, it has been studied to use HC refrigerants which do not destroy the ozone layer and do not facilitate the global warming.

However, since HC refrigerants are flammable, if the refrigerants leak, there is a danger of explosion or firing, and it is necessary to ensure the safety.

Conventionally, it is proposed to light a warning lamp if the leakage of refrigerants is detected as disclosed in Japanese Patent Applications Laid-open No. H3-2113972 and No. H6-180166.

However, the conventional measures have a problem that since the leakage of refrigerant occurs very unusually, even if the user is informed of the leakage of refrigerant, the user does not know how to deal with the leakage and will be at a loss.

Thereupon, the present invention has been accomplished to solve the conventional problem, and it is an object of the invention, in the case of the leakage of a dangerous refrigerant such as flammable refrigerant, to inform a user of the danger and measures to deal with it.

DISCLOSURE OF THE INVENTION

To achieve the above object, according to a first aspect of the present invention, there is provided a refrigerant leakage warning device for an apparatus having a refrigeration cycle using a flammable refrigerant as a refrigerant, wherein when leakage of refrigerant occurs, measures how to cope after the leakage of refrigerant occurs are indicated on an indoor unit. With this feature, since the measures how to cope after the leakage of refrigerant occurs are indicated on the indoor unit which can easily be seen by the user from anywhere in the room, the user can take the measures to cope with it quickly, and it is possible to hold the damage at a minimum, and to enhance the safety.

According to a second aspect, there is provided a refrigerant leakage warning device for an apparatus having a refrigeration cycle using a flammable refrigerant as a refrigerant, wherein measures how to cope after the leakage of refrigerant occurs are indicated on an indoor unit within a predetermined time after the leakage of refrigerant is detected. With this feature, since a time lag is provided after the leakage of refrigerant, the precision of detection can be enhanced, and more appropriate measures after the leakage of refrigerant can be indicated.

In this second aspect, the function and the effect obtained by indicating the measures on the indoor unit can be obtained as in the first aspect.

According to a third aspect, there is provided a refrigerant leakage warning device for an apparatus having a refrigeration cycle using a flammable refrigerant as a refrigerant, wherein when leakage of refrigerant occurs, measures how to cope after the leakage of refrigerant occurs are indicated on a remote controller. With this feature, since the measures are indicated on the remote controller that a user usually put at hand, even the user has bad sight, he or she can easily see the measures, and can take necessary action more quickly at the time of leakage of refrigerant. Therefore, it is possible to hold the damage at a minimum, and to further enhance the safety.

According to a fourth aspect, there is provided a refrigerant leakage warning device for an apparatus having a refrigeration cycle using a flammable refrigerant as a refrigerant, wherein measures how to cope after the leakage of refrigerant occurs are indicated on a remote controller within a predetermined time after the leakage of refrigerant is detected. With this feature, the function and the effect obtained by indicating the measures within the predetermined time can be obtained as in the second aspect, and the function and the effect obtained by indicating the measures on the remote controller can be obtained as in the third aspect.

According to a fifth aspect, there is provided a refrigerant leakage warning device for an apparatus having a refrigeration cycle using a flammable refrigerant as a refrigerant, wherein when leakage of refrigerant occurs, measures how to cope after the leakage of refrigerant occurs are informed to a user via voice.

According to a sixth aspect, there is provided a refrigerant leakage warning device for an apparatus having a refrigeration cycle using a flammable refrigerant as a refrigerant, wherein measures how to cope after the leakage of refrigerant occurs are informed to a user via voice within a predetermined time after the leakage of refrigerant is detected.

According to a seventh aspect, there is provided a refrigerant leakage warning device for an apparatus having a refrigeration cycle using a flammable refrigerant as a refrigerant, wherein when leakage of refrigerant occurs inside a room, measures how to cope after the leakage of refrigerant occurs are informed to a user via voice from an indoor unit.

According to an eighth aspect, there is provided a refrigerant leakage warning device for an apparatus having a refrigeration cycle using a flammable refrigerant as a refrigerant, wherein measures how to cope after the leakage of refrigerant occurs are informed to a user via voice from an indoor unit within a predetermined time after the leakage of refrigerant is detected inside a room.

As described above, according to the fifth to eighth aspects, since the user can be aware more easily if the information is informed via voice, the user can take action more quickly, and it is possible to hold the damage at a minimum, and to enhance the safety.

The function and the effect obtained by informing the user of information when the leakage of refrigerant occurs can be obtained as in the first aspect, and the function and the effect obtained by informing the user of information within the predetermined time can be obtained as in the second aspect.

According to a ninth aspect, there is provided a refrigerant leakage warning device for an apparatus having a refrigeration cycle using a flammable refrigerant as a refrigerant, wherein when leakage of refrigerant occurs outside a room, the leakage of the refrigerant and measures how to cope after the leakage of refrigerant occurs are informed to a user via voice from an indoor unit and an outdoor unit.

According to a tenth aspect, there is provided a refrigerant leakage warning device for an apparatus having a refrigeration cycle using a flammable refrigerant as a refrigerant, wherein the leakage of the refrigerant and measures how to cope after the leakage of refrigerant occurs are informed to a user via voice from an indoor unit and an outdoor unit within a predetermined time after the leakage of refrigerant is detected outside a room.

As described above, in the ninth and tenth aspects, even if the leakage of refrigerant occurs outside the room, both people in the room and people outside the room can easily be aware of the leakage, and it is possible to further enhance the safety.

The function and the effect obtained by informing the user of information when the leakage of refrigerant occurs can be obtained as in the first aspect, and the function and the effect obtained by informing the user of information within the predetermined time can be obtained as in the second aspect.

According to an eleventh aspect, contents of the measures are changed in accordance with a place where the leakage of refrigerant occurs. Since the contents of measures may differ, in some cases, depending on the place where the leakage of refrigerant occurs, if appropriate measures are indicated depending on a case, it is possible to hold the damage at a minimum, and to further enhance the safety.

According to a twelfth aspect, contents of the measures are changed in accordance with a speed of the leakage of refrigerant. Since the contents of measures may differ depending on the speed of leakage of refrigerant in some cases, if appropriate measures are indicated depending on a case, it is possible to hold the damage at a minimum, and to further enhance the safety.

According to a thirteenth aspect, when leakage of the refrigerant occurs, a gas which is heavier than air and which has a smell and/or a color is emitted from an indoor unit.

According to a fourteenth aspect, wherein the gas is methyl mercaptan.

As in the thirteenth and fourteenth aspects, it is possible to inform the user of the danger of leakage of refrigerant more easily using color and/or smell, and it is possible to hold the damage at a minimum, and to enhance the safety.

According to a fifteenth aspect, when leakage of the refrigerant occurs, danger is informed to the inside of a house using an inside communicating means.

According to a sixteenth aspect, the inside communicating means is one of or some of electric wave, telephone line, radio, optical communication, electric line, microwave, infrared rays and supersonic waves.

According to the fifteenth and sixteenth aspects, if the user is in the house, the user can be aware of the leakage of refrigerant even if the leakage occurred in another room and therefore, it is possible to hold the damage at a minimum, and to further enhance the safety.

According to a seventeenth aspect, when leakage of the refrigerant occurs, danger is informed to the outside using an outside communicating means.

According to an eighteenth aspect, the outside communicating means is one of or some of electric wave, telephone line, radio, optical communication, electric line, microwave, infrared rays and supersonic waves.

According to the seventeenth and eighteenth aspects, since the leakage of refrigerant can automatically be informed to a person outside the house, the user can take necessary action more easily, and it is possible to hold the damage at a minimum, and to enhance the safety.

According to a nineteenth aspect, the warning device uses an auxirialy power source which is different from a main power source of the apparatus. With this feature, even if the power source of the apparatus is shut off when the leakage of refrigerant occurs, since the warning device can keep operating, it is possible to further enhance the safety.

BRIEF DESCRIPTION OF DRAWINGS

FIG. 4 is a flowchart showing the embodiment.

BEST MODE FOR CARRYING OUT THE INVENTION

An air conditioner using a flammable refrigerant according to a first embodiment of the present invention will be explained below.

Figure 1:
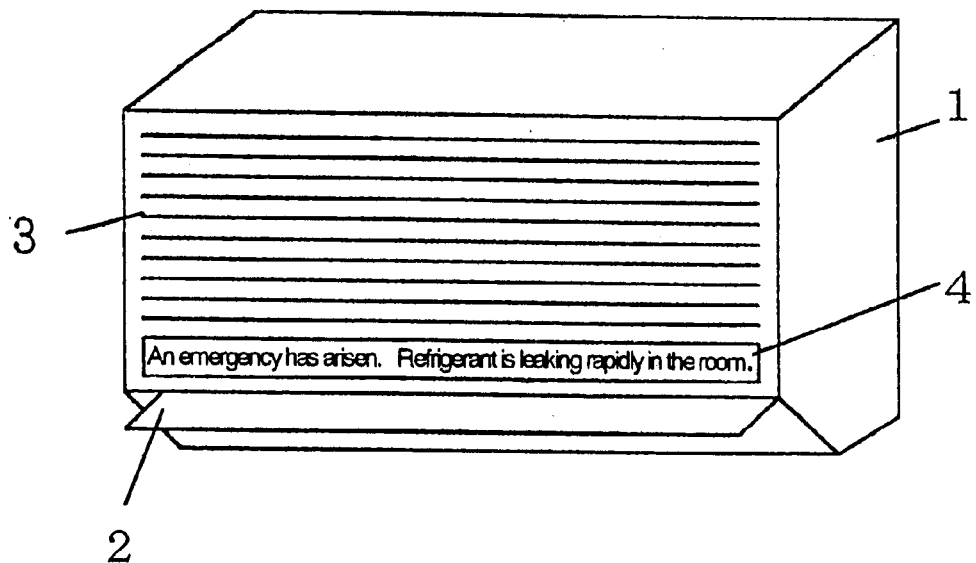
FIG. 1 is a perspective view of an indoor unit having a display device according to an embodiment of the present invention.

FIG. 1 shows an indoor unit on which measures how to cope after the leakage of refrigerant occurs are indicated at a position where a user can easily see.

The reference number 1 represents the indoor unit, 2 represents an air outlet, 3 represents an air inlet, and 4 represents an indication panel as a refrigerant leakage warning device.

The air conditioner of the first embodiment uses a flammable HC refrigerant as a refrigerant, and comprises refrigerant leakage detecting means, and a refrigerant leakage warning device which is operated based on an output value from the refrigerant leakage detecting means. The refrigerant leakage detecting means will be explained later.

If the output value from the refrigerant leakage detecting means indicates the leakage of refrigerant, in accordance with the output value, the refrigerant leakage warning device indicates, on the indoor unit, the leakage of refrigerant and measures how to cope after the leakage.

For example, if the refrigerant leaks in the room, and its leakage speed is very fast faster than α (ml/minute), the refrigerant leakage warning device indicates "An emergency has arisen. Refrigerant is leaking rapidly in the room. Immediately stop the air conditioner, open the window, check the fire and make a telephone call to the service company."

If the refrigerant leaks in the room, and its leakage speed is slow slower than α (ml/minute), the refrigerant leakage warning device indicates "Refrigerant is leaking in the room. Stop the air conditioner, and make a telephone call to the service company."

If the refrigerant leaks outside the room, and its leakage speed is very fast faster than β (ml/minute), the refrigerant leakage warning device indicates, on the indoor unit, "An emergency has arisen. Refrigerant is leaking rapidly outside the room. Immediately stop the air conditioner, check that there is no fire near the air conditioner and make a telephone call to the service company.", and indicates, on an outdoor unit, "An emergency has arisen. Refrigerant is leaking rapidly outside the room. Keep the fire away from the refrigerant."

The sentences to be indicated are not limited if they indicate the leakage of refrigerant and measures to cope with it.

Any method of indication may be used. For example, red "LED" may be lighted in the case of emergency, and yellow "LED" may be lighted when it is necessary to contact the service company although it is not emergency.

The refrigerant leakage warning device uses a battery as an auxiliary power source. Therefore, for example, when the leakage of refrigerant occurs, even if a control is carried out such that all of the power sources of the air conditioner are shut off so as to prevent the explosion, it is possible to let at least the refrigerant leakage warning device keep operating and therefore, the safety can be ensured.

Other than the battery, any means such as a solar battery, a lead-acid battery or the like may be used as the auxiliary power source, only if it is different from the power source of the air conditioner.

In an air conditioner of a second embodiment, the information at the time of leakage of refrigerant is indicated on a remote controller which is disposed on a place where the user can easily see, instead on the indoor unit of the first embodiment. The contents of the indication are the same as those of the first embodiment.

An air conditioner of a third embodiment informs the user of the information at the time of leakage of refrigerant via voice from the indoor unit instead of visual indication of the first embodiment.

Any means may be used if it can generate voice to inform the user of the danger. For example, using communication means, a refrigerant leakage signal is sent to various appliances such as a remote controller, a television set and an audio device so that the voice is generated from these appliances.

An air conditioner of a fourth embodiment informs the user of the danger of refrigerant leakage by flowing out methyl mercaptan having strong smell when the leakage of refrigerant occurs.

Figure 2:
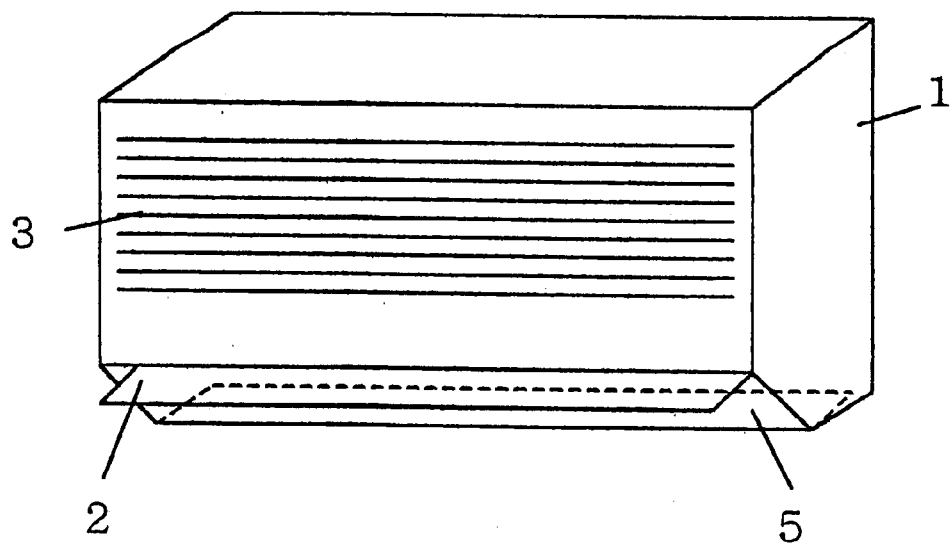
FIG. 2 is a perspective view of an indoor unit having a gas container according to another embodiment of the invention.

FIG. 2 shows an indoor unit having a gas container. Elements similar to those in FIG. 1 are represented with the same reference number, and their explanations will be omitted. The reference number 5 represents the gas container.

As shown in FIG. 2, the gas container in which methyl mercaptan is charged is disposed in a lower portion of the air outlet of the air conditioner. When the output value from the refrigerant leakage detecting means indicates the leakage of refrigerant, the gas container 5 is automatically opened. The methyl mercaptan flows out from the gas container 5, and its smell wafts in on the wind of the air conditioner and reaches the user so that the user is aware of the leakage of refrigerant, takes necessary measures such as opening the window of the room and makes a telephone call to the service company.

The gas charged in the gas container 5 is not limited to the methyl mercaptan, and other gases having color or smell may be used.

A warning device of a fifth embodiment automatically informs, when the leakage of refrigerant occurs, another room in a house of the danger using inside communication means, and informs the outside service company of the danger using outside communication means.

The inside communication means uses electric wave to transmit electric wave, and sends a signal to a television set or the like in the other room. In the other room, the leakage of refrigerant and the measures to cope with it are automatically indicated on the television screen.

The inside communication means is not limited to the electric wave. Telephone line, radio, optical communication, electric line, microwave, infrared rays or supersonic waves may be used.

The outside communication means used a telephone line to inform the service company of the danger through conversion means which converts a signal of the warning device into a telephone number. In reply to the communication, the service company immediately goes directly to the place where the leakage of refrigerant happened.

The outside communication means is not limited to the telephone line. Electric wave, radio, optical communication, electric line, microwave, infrared rays or supersonic waves may be used.

Figure 3:
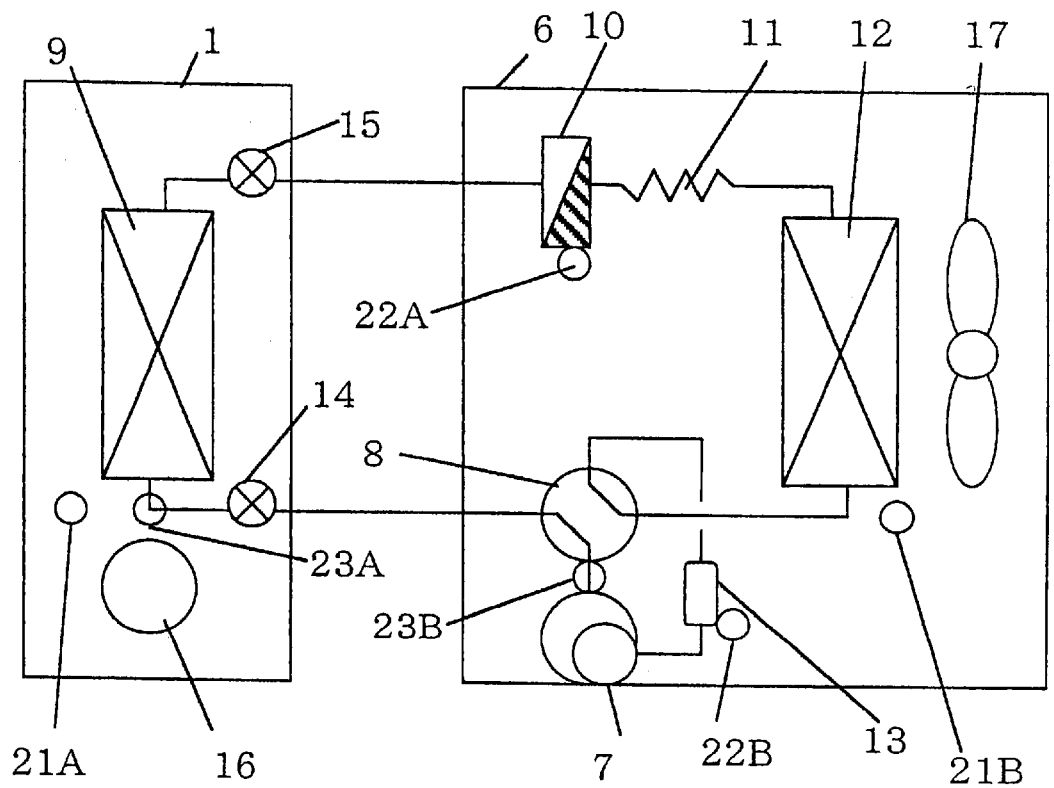
FIG. 3 is a block diagram showing an embodiment of refrigerant leakage detecting means of the invention.

Next, the refrigerant leakage detecting means will be explained with reference to FIG. 3.

The air conditioner comprises the indoor unit 1 and the outdoor unit 6. A refrigeration cycle comprises a compressor 7, a 4-way valve 8, an indoor heat exchanger 9, a refrigerant separator 10, a decompressor 11, an outdoor heat exchanger 12, an accumulator 13 and the like, all of which are connected to one another through pipes. On-off valves 14 and 15 capable of shutting off refrigerant passages of the indoor unit 1 and the outdoor unit 6 are provided in the pipes of the refrigeration cycle. The indoor heat exchanger 9 is disposed in the indoor unit 1. The compressor 7, the 4-way valve 8, the refrigerant separator 10, the decompressor 11, the outdoor heat exchanger 12, and the accumulator 13 are disposed in the outdoor unit 6. An indoor air-blower 16 is disposed in the indoor unit 1, and an outdoor air-blower 17 is disposed in the outdoor unit 6.

As the refrigerant leakage detecting means, there are refrigerant leakage detecting sensors 21A and 21B which directly detect the refrigerant leaked from the pipes. FIG. 3 shows a case in which the indoor unit 1 and the outdoor unit 6 are respectively provided with the refrigerant leakage detecting sensors 21A and 21B one each, but if the necessary number of sensors are disposed in places where the leaked refrigerant is prone to stay or in air passages and the like where the leaked refrigerant is prone to flow, it is possible to enhance the detection precision, and to indicate appropriate measures when the refrigerant leaks.

As other refrigerant leakage detecting means, there are refrigerant component detecting sensors 22A and 22B. Such refrigerant component detecting sensors 22A and 22B are effective when two or more kinds of refrigerants are used in the refrigeration cycle. By using the refrigerant component detecting sensors 22A and 22B, it is possible to predict a leakage place such as whether the refrigerant leaks from a gas region or a liquid region by detecting variation of component ratio. It is also possible to predict a speed of refrigerant leakage from a speed of the variation in component. These refrigerant component detecting sensors 22A and 22B can detect the variation in refrigerant component by detecting the liquid component accumulated in the refrigerant separator 10, the accumulator 13 and the like.

As other refrigerant leakage detecting means, there are refrigerant pressure detecting means 23A and 23B which detects variation in refrigerant pressure. Such refrigerant pressure detecting means 23A and 23B, when the air conditioner is normally operating, detect whether the pressure of the refrigerant is within a normal pressure range, and when the air conditioner is stopped, detect a pressure drop after the pressure in the pipes is balanced.

The pressure when the air conditioner is operating can be detected by the refrigerant detecting means 23B. If the indoor unit and the outdoor unit are insulated from each other by means of the on-off valves 14 and 15 when the air conditioner is stopped, it is preferable to provide the refrigerant pressure detecting means 23A in the indoor unit 1, and the refrigerant pressure detecting means 23B in the outdoor unit 6 as shown in FIG. 3.

The refrigerant leakage detecting means 21A and the refrigerant pressure detecting means 23A can be used as refrigerant leakage detecting means for detecting occurrence of the leakage of refrigerant in the room, and the refrigerant leakage detecting sensor 21B and the refrigerant pressure detecting means 23B can be used as refrigerant leakage detecting means for detecting occurrence of the leakage of refrigerant outside the room.

As described above, variation in pressure or component of the refrigerant, the place and the speed of the leakage of refrigerant are detected by the refrigerant leakage detecting sensors, and the detected information is sent to the refrigerant leakage warning device.

Means and method of the refrigerant leakage detecting means are not limited to those described above if the leakage of refrigerant can be detected, and a plurality of the above-described refrigerant leakage detecting means may be used.

One example of the operation from detection of the leakage of refrigerant and indication of the measures will be explained next with reference to FIGS. 3 and 4. The present embodiment, the measures to cope with the leakage of refrigerant are indicated within a predetermined time after the leakage of refrigerant is detected.

When the air conditioner is normally operating, if the refrigerant component detecting sensors 22A and 22B, or the refrigerant pressure detecting means 22B detects the leakage of refrigerant from abnormal variation in component or pressure of the refrigerant (step 1), an abnormal state is indicated in step 2. Then, in step 3, the appliances are controlled. One example of the control of the appliances is to stop the compressor 7, the indoor air-blower 16 and the outdoor air-blower 17. In this case, in step 4, the leakage place is detected by the refrigerant leakage detection sensors 21A or 21B disposed in the indoor unit 1 or the outdoor unit 6. If the refrigerant leakage detecting sensor 21A detects the leakage, it is judged that the leakage happened in the room, and if the refrigerant leakage detecting sensor 21B detects the leakage, it is judged that the leakage happened outside the room, and respective measures are indicated in step 5.

Another example of the control of the appliances is to close the on-off valve 14 at the time of warming operation, and closes the on-off valve 15 at the time of cooling operation, to operate the compressor 7 for a predetermined time and then, to close the on-off valve 15 at the time of warming operation, and close the on-off valve 14 at the time of cooling operation. By controlling the appliance in this manner, it is possible to store the refrigerant at the side of the outdoor unit 6. In this case, the place of leakage is detected in step 4 by the refrigerant leakage detecting sensor 21B or the refrigerant pressure detecting means 23A and 23B provided in the indoor unit 1 and the outdoor unit 6. If the refrigerant pressure detecting means 23A detects the leakage, it is judged that the leakage happened in the room, and if the refrigerant leakage detecting sensor 21B or the refrigerant pressure detecting means 23B detects the leakage, it is judged that the leakage happened outside the room, and the respective measures are indicated in step 5.

Another example of the control of the appliances is to keep operating the air conditioner as it is. In step 4, it is checked whether the same detection signal is output after a predetermined time is elapsed from the detection of the leakage of refrigerant in step 1. If the same detection signal is output, it is judged that the refrigerant leaks, and the measures are indicated in step 5. If the leakage of refrigerant is not detected in step 4, the fact that no abnormal state is indicated.

In the present embodiment, after the leakage of refrigerant is detected, the appliances are controlled to specify the place of leakage of refrigerant, or after the predetermined time is elapsed from the detection of the leakage of refrigerant, the leakage of refrigerant is again checked, so that it is possible to judge the leakage of refrigerant more reliably. Therefore, even if sensitivity of the refrigerant leakage detecting means is increased, it is possible to reduce the erroneous detection.

Further, as another embodiment, the detection of the leakage of refrigerant in step 4 may be carried out in step 1, and after the appliances are controlled, the measures to cope with the leakage may be indicated in step 5. For example, if the leakage of refrigerant is detected in the room in step 1, in step 3, the on-off valve 14 is first closed at the time of warming operation, or the on-off valve 15 is first closed at the time of cooling operation, and after the compressor 7 is operated for a predetermined time, the on-off valve 15 is closed at the time of warming operation, or the on-off valve 14 is closed at the time of cooling operation. In step 5, the measures such as "Do not operate the air conditioner again. Make a telephone call to the service company." is indicated. When the control of appliances such as stopping the compressor 7 or closing the on-off valves 14 and 15 is completed within an extremely short time, it is not always necessary to indicate the measures in step 2, and it is preferable to indicate the measures in step 5. In this manner, the appliances may be first controlled after the leakage of refrigerant is detected, and the measures may be indicated after a time lag.

As described above, according to the present invention, when the leakage of refrigerant occurs, the user can see the indication of the leakage and take the measures to cope with it, and it is possible to hold the damage at a minimum, and to enhance the safety.

Further, according to the present invention, when the leakage of refrigerant occurs, the user can be aware of it through voice and can take the measures to cope with it earlier, and it is possible to hold the damage at a minimum, and to enhance the safety.

Further, it is possible to easily inform the user of the danger by generating gas having smell or color when the leakage of refrigerant occurs, and it is possible to hold the damage at a minimum, and to enhance the safety.

Furthermore, when the leakage of refrigerant occurs, even if the user is in another room, it is possible to inform the user of the danger by using the inside communicating means so that the user can take the measures immediately, and it is possible to hold the damage at a minimum, and to enhance the safety.

Further, when the leakage of refrigerant occurs, it is possible to automatically contact with the service company by using the outside communicating means, and it is possible to further enhance the safety.

By providing an auxiliary power source of the warning device separately from a power source of the apparatus, even if the power source of the apparatus is cut off, it is possible to inform the user of the danger, and to further enhance the safety.

What is claimed is:

1. A refrigerant leakage warning device for an apparatus having a refrigeration cycle using a flammable refrigerant as a refrigerant, wherein when leakage of refrigerant occurs, measures how to cope after the leakage of refrigerant occurs are indicated on an indoor unit.

2. A refrigerant leakage warning device for an apparatus having a refrigeration cycle using a flammable refrigerant as a refrigerant, wherein measures how to cope after the leakage of refrigerant occurs are indicated on an indoor unit within a predetermined time after the leakage of refrigerant is detected.

3. A refrigerant leakage warning device for an apparatus having a refrigeration cycle using a flammable refrigerant as a refrigerant, wherein when leakage of refrigerant occurs, measures how to cope after the leakage of refrigerant occurs are indicated on a remote controller.

4. A refrigerant leakage warning device for an apparatus having a refrigeration cycle using a flammable refrigerant as a refrigerant, wherein measures how to cope after the leakage of refrigerant occurs are indicated on a remote controller within a predetermined time after the leakage of refrigerant is detected.

5. A refrigerant leakage warning device for an apparatus having a refrigeration cycle using a flammable refrigerant as a refrigerant, wherein when leakage of refrigerant occurs, measures how to cope after the leakage of refrigerant occurs are informed to a user via voice.

6. A refrigerant leakage warning device for an apparatus having a refrigeration cycle using a flammable refrigerant as a refrigerant, wherein measures how to cope after the leakage of refrigerant occurs are informed to a user via voice within a predetermined time after the leakage of refrigerant is detected.

7. A refrigerant leakage warning device for an apparatus having a refrigeration cycle using a flammable refrigerant as a refrigerant, wherein when leakage of refrigerant occurs in a room, measures how to cope after the leakage of refrigerant occurs are informed to a user via voice from an indoor unit.

8. A refrigerant leakage warning device for an apparatus having a refrigeration cycle using a flammable refrigerant as a refrigerant, wherein measures how to cope after the leakage of refrigerant occurs are informed to a user via voice from an indoor unit within a predetermined time after the leakage of refrigerant is detected inside a room.

9. A refrigerant leakage warning device for an apparatus having a refrigeration cycle using a flammable refrigerant as a refrigerant, wherein when leakage of refrigerant occurs outside a room, the leakage of the refrigerant and measures how to cope after the leakage of refrigerant occurs are informed to a user via voice from an indoor unit and an outdoor unit.

10. A refrigerant leakage warning device for an apparatus having a refrigeration cycle using a flammable refrigerant as a refrigerant, wherein the leakage of the refrigerant and measures how to cope after the leakage of refrigerant occurs are informed to a user via voice from an indoor unit and an outdoor unit within a predetermined time after the leakage of refrigerant is detected outside a room.

11. A refrigerant leakage warning device for an apparatus having a refrigeration cycle using a flammable refrigerant as a refrigerant according to any one of claims 1 to 6, wherein contents of said measures are changed in accordance with a place where said leakage of refrigerant occurs.

12. A refrigerant leakage warning device for an apparatus having a refrigeration cycle using a flammable refrigerant as a refrigerant according to any one of claims 1 to 10, wherein contents of said measures are changed in accordance with a speed of said leakage of refrigerant occurs.

13. A refrigerant leakage warning device for an apparatus having a refrigeration cycle using a flammable refrigerant as a refrigerant, wherein when leakage of refrigerant occurs, a gas which is heavier than air and which has a smell and/or a color is emitted from an indoor unit.

14. A refrigerant leakage warning device for an apparatus having a refrigeration cycle using a flammable refrigerant as a refrigerant according to claim 13, wherein said gas is methyl mercaptan.

15. A refrigerant leakage warning device for an apparatus having a refrigeration cycle using a flammable refrigerant as a refrigerant according to any one of claims 1 to 10, wherein when leakage of refrigerant occurs, danger is informed to the inside of a house using an inside communicating means.

16. A refrigerant leakage warning device for an apparatus having a refrigeration cycle using a flammable refrigerant as a refrigerant according to claim 15, wherein said inside communicating means is one of or some of electric wave, telephone line, radio, optical communication, electric line, microwave, infrared rays and supersonic waves.

17. A refrigerant leakage warning device for an apparatus having a refrigeration cycle using a flammable refrigerant as a refrigerant according to any one of claims 1 to 10, wherein when leakage of refrigerant occurs, danger is informed to the outside using an outside communicating means.

18. A refrigerant leakage warning device for an apparatus having a refrigeration cycle using a flammable refrigerant as a refrigerant according to claim 17, wherein said outside communicating means is one of or some of electric wave, telephone line, radio, optical communication, electric line, microwave, infrared rays and supersonic waves.

19. A refrigerant leakage warning device for an apparatus having a refrigeration cycle using a flammable refrigerant as a refrigerant according to any one of claims 1 to 10, wherein said warning device uses an auxiliary power source which is different from a main power source of said freezer.

* * * * *